United States Patent
Gruber

(10) Patent No.: US 8,731,476 B2
(45) Date of Patent: May 20, 2014

(54) DEVICE FOR AND METHOD OF CHARACTERIZING AN OBJECT

(75) Inventor: Bernhard Gruber, Gratwein (AT)

(73) Assignee: Peter Zawilski, Eindhoven (NL)

( * ) Notice: Subject to any disclaimer, the term of this patent is extended or adjusted under 35 U.S.C. 154(b) by 512 days.

(21) Appl. No.: 12/530,279

(22) PCT Filed: Mar. 12, 2008

(86) PCT No.: PCT/IB2008/050894
§ 371 (c)(1),
(2), (4) Date: Sep. 8, 2009

(87) PCT Pub. No.: WO2008/114168
PCT Pub. Date: Sep. 25, 2008

(65) Prior Publication Data
US 2010/0015925 A1     Jan. 21, 2010

(30) Foreign Application Priority Data

Mar. 19, 2007 (EP) ..................................... 07104416

(51) Int. Cl.
*H04B 17/00* (2006.01)
*H04B 5/00* (2006.01)
*H04B 7/00* (2006.01)

(52) U.S. Cl.
USPC ........................ 455/67.11; 455/41.1; 455/41.2

(58) Field of Classification Search
None
See application file for complete search history.

(56) References Cited

U.S. PATENT DOCUMENTS

| | | | |
|---|---|---|---|
| 5,394,097 A | 2/1995 | Bechtel et al. | |
| 7,035,428 B1 | 4/2006 | Smith | |
| 7,154,283 B1 * | 12/2006 | Weakley et al. | 324/756.01 |
| 2003/0020604 A1 * | 1/2003 | Fischer et al. | 340/442 |
| 2004/0207392 A1 * | 10/2004 | Kernhof | 324/207.25 |
| 2005/0231367 A1 * | 10/2005 | Bellantoni | 340/572.1 |
| 2006/0022815 A1 | 2/2006 | Fischer et al. | |
| 2006/0103534 A1 * | 5/2006 | Arms et al. | 340/572.1 |
| 2006/0170553 A1 * | 8/2006 | Bierach | 340/572.4 |
| 2006/0181417 A1 * | 8/2006 | Pullmann et al. | 340/545.2 |
| 2006/0202705 A1 * | 9/2006 | Forster | 324/750 |
| 2006/0220859 A1 * | 10/2006 | Nagai et al. | 340/572.1 |
| 2007/0018833 A1 * | 1/2007 | Higashionji et al. | 340/572.7 |
| 2007/0296586 A1 * | 12/2007 | Mickle et al. | 340/572.1 |

FOREIGN PATENT DOCUMENTS

| WO | 0137202 A1 | 5/2001 |
|---|---|---|
| WO | 2006115756 A1 | 2/2006 |

* cited by examiner

*Primary Examiner* — Ajibola Akinyemi
*Assistant Examiner* — Ayodeji Ayotunde

(57) ABSTRACT

A device for characterizing an object (100, 503, 504) is provided wherein the device comprises a first sensor element (310) and a determination unit (508), wherein the first sensor element (310) is adapted to measure a value of a physical parameter of an object (100, 503, 504), wherein the physical parameter has an impact on a signal of a contactless transmission element arranged (511, 512) on the object (503, 504), and wherein the determination unit (508) is adapted to determine an impact value based on the measured value of the physical parameter.

26 Claims, 4 Drawing Sheets

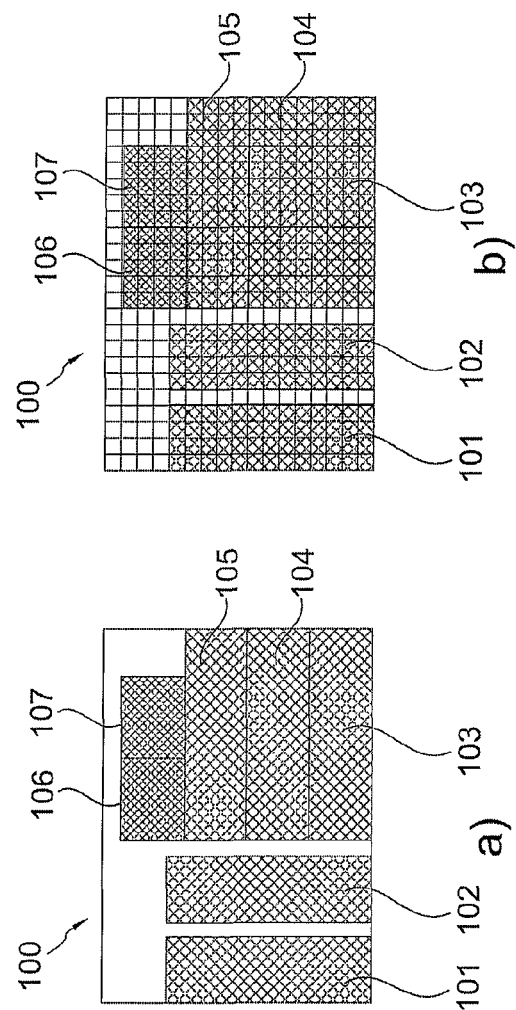
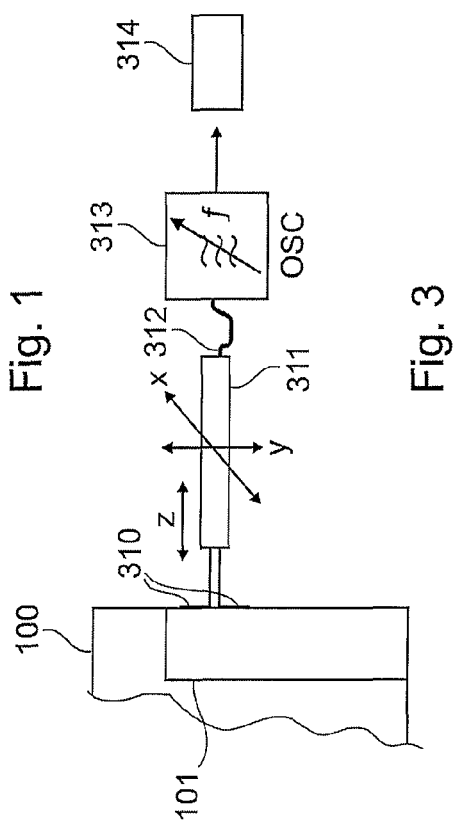
Fig. 1
Fig. 3

DEVICE FOR AND METHOD OF CHARACTERIZING AN OBJECT

FIELD OF THE INVENTION

The invention relates to a device for characterizing an object.

Beyond this, the invention relates to a system for attaching a contactless transmission element onto an object.

Furthermore, the invention relates to a method of characterizing an object.

Moreover, the invention relates to a computer-readable medium.

Additionally, the invention relates to a program element.

BACKGROUND OF THE INVENTION

To maximize the benefit of RFID installations a good understanding of the environment and the respective influence on the used technology is important. Especially with higher frequencies the quality of the environment on which an antenna of an RFID-tag/label is placed is affecting the parameters of the antenna and thus affecting the performance of the said RFID device.

A common RFID performance monitoring system may include systems, methods, or computer program products for collecting information related to the performance of an RFID system. In particular, signal strength and/or signal sensitivity of the individual RFID tags may be measured and the resulting performance information may be stored in a data repository. In the data repository, the performance information for an individual tag may be associated with an identifier that is uniquely associated with the tag. It is known, that the performance information may be used by an on-line system configured to automatically determine the performance margin with which RFID tags are being read in an RFID system, or to automatically tune the RFID system to achieve a desired performance margin.

Furthermore, the objects/products that should be used with RFID technology can be simulated to get an understanding of their influence on RFID devices and their respective antenna. However, the accuracy of these simulations depend on the accuracy of the model on one hand and on the limitations in terms of variations of different real life scenarios on the other hand.

OBJECT AND SUMMARY OF THE INVENTION

It is an object of the invention to provide a device for characterizing an object, a system for attaching a contactless transmission element onto an object, a method of characterizing an object, a computer-readable medium, and a program element, wherein the device for and method of characterizing an object, may yield a more accurate determination of the influence of an object onto a contactless transmission element.

In order to achieve the object defined above, a device for characterizing an object, a system for attaching a contactless transmission element onto an object, a method of characterizing an object, a computer-readable medium, and a program element according to the independent claims are provided.

According to an exemplary embodiment, a device for characterizing an object is provided, wherein the device comprises a first sensor element and a determination unit, wherein the first sensor element is adapted to measure a value of a physical parameter of an object, wherein the physical parameter has an impact on a signal of a contactless transmission element arranged on the object, and wherein the determination unit is adapted to determine an impact value based on the measured value of the physical parameter. In particular, the impact value may characterize at least a portion of the object. The impact or influence may in particular relate to the transmission quality of the signal. In particular, several values of the physical parameter may be measured, e.g. for different positions of the object so that a mapping of the surface of the object may be possible.

According to an exemplary embodiment, a system for attaching a contactless transmission element onto an object is provided, wherein the system comprises a device according to an exemplary embodiment of the invention and a contactless transmission element printer, wherein the contactless transmission element printer is adapted to print a specific contactless transmission element based on the determined impact value. In particular, the printer may be adapted to print a plurality of different contactless transmission elements, wherein each of the contactless transmission elements may be differently influenced by the physical parameter, e.g. may exhibit a different sensitivity to variations of the measured physical parameter. Furthermore, the printer may optionally be also adapted to print the contactless transmission element direct onto the object.

According to an exemplary embodiment, a method of characterizing an object is provided, wherein the method comprises measuring a value of a physical parameter of an object by a first sensor element, wherein the physical parameter has an impact on a signal of a contactless transmission element arranged on the object, and determining an impact value based on the measured value by a determination unit. In particular, the impact value may represent an impact of at least a portion of the object on a signal of a contactless transmission element arranged on the object.

According to an exemplary embodiment, a program element is provided which, when being executed by a processor, is adapted to control or to carry out a method of characterizing an object, wherein the method comprises measuring a value of a physical parameter of an object by a first sensor element, wherein the physical parameter has an impact on a signal of a contactless transmission element arranged on the object, and determining an impact value based on the measured value by a determination unit.

According to an exemplary embodiment, a computer-readable medium is provided, in which a computer program is stored which, when being executed by a processor, is adapted to control or carry out a method of characterizing an object, wherein the method comprises measuring a value of a physical parameter of an object by a first sensor element, wherein the physical parameter has an impact on a signal of a contactless transmission element arranged on the object, and determining an impact value based on the measured value by a determination unit.

In particular, data processing or signal processing which may be performed according to embodiments of the invention can be realized by a computer program, that is by software, or by using one or more special electronic optimization circuits, that is in hardware, or in hybrid form, that is by software components and hardware components.

The term "physical parameter" may particularly denote a parameter which relates to a physical quantity like length, energy, time, current, relative dielectric constant or the like.

The term "impact value" or "influence value" may particularly denote the magnitude or extent a given signal, which is to be transmitted is influenced or affected when the magnitude of the physical parameter is changed. That is, the impact value may correspond to a perturbation of a given signal to be transmitted, for example due to the influence of a dielectric media close to the contactless transmission element.

The term "contactless transmission element" may particularly denote an element which is adapted to transmit, emit or receive a signal, e.g. a radio frequency signal, an infrared signal, an acoustic signal or the like, which signal may include information or may be able to communicate information. In this context it should be noted that the information may be either transmitted by actively emitting a signal, or the information may be transmitted by passively changing a signal emitted by another device. Thus, in a broader sense it is also denoted as transmitting a signal when a passive device, e.g. an RFID-tag, changes the frequency of a signal emitted by another device, e.g. a transponder, e.g. by changing a load the sender of the transponder is exposed to.

It may be seen as a gist of an exemplary embodiment, that a method of and a device for characterizing an object is provided, in which the object is sampled or scanned by a sensor unit which sensor unit is adapted to measure a physical parameter. Then a determination unit may determine, on basis of the measured parameter, an impact or influence value, e.g. a value which is indicative for the magnitude a specific contactless transmission element, e.g. an RFID-tag is disturbed by the object, in particular in case the contactless transmission element is arranged on the object.

Thus, it may be possible to avoid that the possible influences of an object onto the contactless transmission element must be simulated to get an understanding of its influence on the contactless transmission element and respective sending/receiving units, e.g. antennas, which simulation is a known way to analyze possible influences. The accuracy of these simulations depend on the accuracy of the model on one hand and on the limitations in terms of variations of different real life scenarios on the other hand. Contrary to that, according to an exemplary embodiment of the invention, the influences may be directly determined on measured values of a physical parameter. Thus, by using a method according to an exemplary embodiment of the invention, it may be also possible to avoid a common trial and error procedure. In known procedures a good understanding of the used contactless transmission element is assumed, e.g. tag or label, with respect of its efficiency and assembly process as well as it requires an enormous amount of runs to find a suitable place or position to arrange the contactless transmission element. In such known simulation techniques, the accuracy is typically limited by the form-factor of the used contactless transmission element, e.g. RFID-tag, and the sensitivity of the used RFID-tag antenna that is affected by the environmental influence, while by using a method according to an exemplary embodiment these limitations may not be given. In particular, it may be possible to place a given contactless transmission element in such a way onto the object that it is least influenced by the object, e.g. at least the portion of the contactless transmission element which is most sensitive to influences of the object may be placed over a portion of the object which will least influence the contactless transmission element.

Next, further exemplary embodiments of the device for characterizing an object are described. However, these embodiments also apply to the system for attaching a contactless transmission element onto an object, the method of characterizing an object, the computer-readable medium, and the program element.

According to another exemplary embodiment of the device the physical parameter is one of the group consisting of relative permeability, relative dielectric constant, and loss or lossy angle also called quality, e.g. the ratio of active energy to total energy, which may also expressed by an angle, e.g. $\tan(\delta)$. All of the above physical parameters may be measured per area, i.e. as relative permeability per square meter, relative dielectric constant per square meter, or loss angle ($\tan \delta$) per square meter.

All these physical parameters may be suitable parameters to determine an impact the object may have onto the transmission quality of a signal of a contactless transmission element. In particular, the relative dielectric constant or the relative permeability of the object may have an influence of a frequency associated with an RFID-tag, e.g. a UHF RFID-tag or an HF RFID-tag.

According to another exemplary embodiment of the device, the contactless transmission element is an RFID-tag. In particular, the RFID-tag may be a UHF-RFID-tag or an HF-RFID-tag.

RFID-tags may be an efficient contactless transmission elements which may be used to store and transmit information about an object they are affixed to a transponder unit in a contactless manner.

According to another exemplary embodiment of the device, the determination unit is further adapted to determine a matrix of impact values. In particular, a two-dimensional or three-dimensional matrix, wherein each single matrix value may characterize a surface position of the object. Thus, the surface of the object may be scanned with respect to the physical parameter, like relative dielectric constant or relative permeability, leading to an array of impact or influence values, which form a kind of map of the surface of the object.

According to another exemplary embodiment of the device, the determination unit is further adapted to determine a position on the object at which the object has a minimum impact on the signal of the contactless transmission element. In particular, the position may be determined based on the determined impact value or directly on the measured values.

By using the information of the determined impact values it may be possible to provide an efficient way to locate a position on the object onto which location a contactless transmission element may be fixed while ensuring that the contactless transmission element is least affected by the nature of the object. In particular, by providing a map of determined impact values in form of a two or three dimensional matrix, it may be provided an efficient way to categorize the object with respect to suitable and improper locations or positions to affix the contactless transmission element onto. That is, it may be ensureable to always determine the optimum place to attach the contactless transmission element by determining impact values for each point on the surface of the object.

According to another exemplary embodiment of the device, the determination unit is further adapted to select a specific contactless transmission element out of a plurality of contactless transmission elements based on the determined impact value. In particular, the plurality of contactless transmission elements comprises different types of contactless transmission elements which have different sensibility to variations of the values of the measured physical parameter and wherein a type of contactless transmission elements is selected which ensures the best performance of the contactless transmission element, wherein the selection is based on the determined impact value.

Such a selection may be in particular advantageous in the case that a plurality of different contactless transmission elements are available so that a contactless transmission element may be selected which best suits the determined impact values. For example, in case the object has a high relative dielectric constant, it may be advantageous to select an HF RFID-tag, while it may be advantageous to select a UHF RFID-tag in case a high relative permeability value of the object may be measured so that a high impact value is determined concerning an HF RFID-tag.

According to another exemplary embodiment, the device further comprises a plurality of sensor elements. In particular, at least one of the plurality of sensor elements is adapted to measure a second physical parameter.

By providing a plurality of sensor elements it may be possible to scan the object in an efficient and fast manner, since a plurality of positions of the object may be scanned simultaneously. Each measurement of each single sensor element may relate to one matrix element or pixel of a two or three dimensional matrix of impact values. That is, from each single measurement of a single physical parameter of a single sensor element an impact value may be determined. In particular, in the case different sensor elements are used an efficient way may be provided by which the object is scanned with respect to different physical parameters. For example, some of the plurality of sensor elements may be adapted to measure the relative dielectric constant while others of the plurality of sensor elements may be adapted to measure the relative permeability.

According to another exemplary embodiment of the device, the plurality of sensors are arranged in a staggered manner with respect to each other.

By providing at least some of the plurality of sensor elements in a staggered manner, i.e. slightly misplaced with respect to each other, an efficient way to scan the object may be provided, in particular in the case that the object and the sensor elements are moved relative to each other, e.g. the object is moved past the sensor elements on a conveyor belt. The staggered sensor elements may form a chessboard like structure.

According to another exemplary embodiment of the device, the first sensor element is fixed to an actuator. In particular, the actuator is adapted for positioning the first sensor element relative to the object. For example, the actuator may be adapted to move the first sensor element in an x-direction, an y-direction and/or a z-direction, i.e. in all linearly independent directions of a Cartesian coordinate system.

Thus, it may be possible to scan the total object with respect to the first physical parameter by only one single sensor element, so that the total object may be characterized with respect to the first physical parameter and the resulting impact values.

According to another exemplary embodiment of the device, the determination unit is further adapted to categorize determined impact values into a plurality of classes. In particular, the device may further comprise a storage unit, wherein the storage unit is adapted to store a lookup table, linking each determined impact value with one of the plurality of classes.

For example, the determination may categorize the object with respect to the determined impact values based on the measured relative dielectric constant. For example, an object exhibiting a high relative dielectric constant may be categorized into a first class or category, an object exhibiting a medium relative dielectric constant may be categorized into a second class, while an object exhibiting a low relative dielectric constant may be categorized into a third class. The categorization into different classes may also be based on more than one physical parameter, e.g. may relate to a combination of relative dielectric constant and relative permeability. To each different class a corresponding contactless transmission element type may be associated, so that by determining the class a suitable contactless transmission element can be determined by using the lookup table.

Next, further exemplary embodiments of the system for attaching a contactless transmission element onto an object are described. However, these embodiments also apply to the device for characterizing an object, the method of characterizing an object, the computer-readable medium, and the program element.

According to another exemplary embodiment, the system further comprises an attaching unit, wherein the attaching unit is adapted to attach the printed specific contactless transmission element onto the object at a position at which the physical parameter has the least impact on a signal to be transmitted by the contactless transmission element. In particular, the system may further comprise a conveyor, wherein the conveyor is adapted to convey the object from the sensor element to the attaching unit.

By providing such a system comprising a device for characterizing an object, an attaching unit and (optionally) a conveyor, an efficient system may be provided to determine a suitable position on an object at which position a contactless transmission element may be attached, and to attach the respective contactless transmission element onto the object at the determined position. Thus, the system may be formed like an assembly line wherein an object is placed on a conveyor belt which then transports the object to different stations of the assembly line, at which stations firstly at least one physical parameter is measured by one or a plurality of sensor elements, afterwards the corresponding impact values are determined based on the measured physical parameters to determine suitable positions on the object. Afterwards, a suitable contactless transmission element is attached at the determined optimum position.

According to another exemplary embodiment of the system, the contactless transmission element printer comprises a plurality of sub-units, wherein each sub-unit is adapted to print one specific contactless transmission element. For example, a first sub-unit may be adapted to print UHF RFID-tags, while a second sub-unit may be adapted to print HF RFID-tags. Thus, it may be possible to provide a plurality of different contactless transmission elements which can be attached to the object at positions which are suitable to ensure that the impact of the object on the quality of the signal transmission of the contactless transmission elements is minimal.

Next, further exemplary embodiments of a method of characterizing an object are described. However, these embodiments also apply to the device for characterizing an object, the system for attaching a contactless transmission element onto an object, the computer-readable medium, and the program element.

According to another exemplary embodiment, the method further comprises determining a position on the object based on the determined impact value, at which the object has a minimum impact on the signal of the contactless transmission element. In particular, the method may further comprise attaching the contactless transmission element at the determined position onto the object by an attaching unit.

According to another exemplary embodiment, the method further comprises conveying the object to the first sensor element before the physical parameter is measured, and conveying the object from the first sensor element to the attaching unit after the physical parameter is measured.

Summarizing, one exemplary aspect of the invention may be seen in a method that does a characterization of objects with respect to their relevant parameters via a matrix-based measurement of the selected parameter. The generated data may be used to detect the area that has lowest possible impact on an affixed RFID-tag or RFID-label and therefore may enable best performance of the used technology. Thus, an apparatus implementing said method may be used for finding the optimal RFID-tag/label placement that best fits to the tag/label infrastructure, e.g. the design of the tag. Furthermore, such an apparatus may be suitable to categorize products depending on their parameters and therefore may find the best combination of RFID tag/label and/or placement on objects/products. By using a corresponding apparatus and/or method according to this exemplary aspect, it may be possible to overcome problems induced by known simulation and trial and error procedures which do not yield into a representative characterization of the object/product more accurate than the RFID tag/label used for the simulation/test. In particular, it may be possible to overcome these problems by characterizing object/products in small subsets on the parameter of interest, as proposed by this exemplary aspect of the invention.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

FIG. 1 schematically illustrates a cardboard box with different products inside the box.

FIG. 3 schematically illustrates a sensor arrangement.

DESCRIPTION OF EMBODIMENTS

Figure 2A:
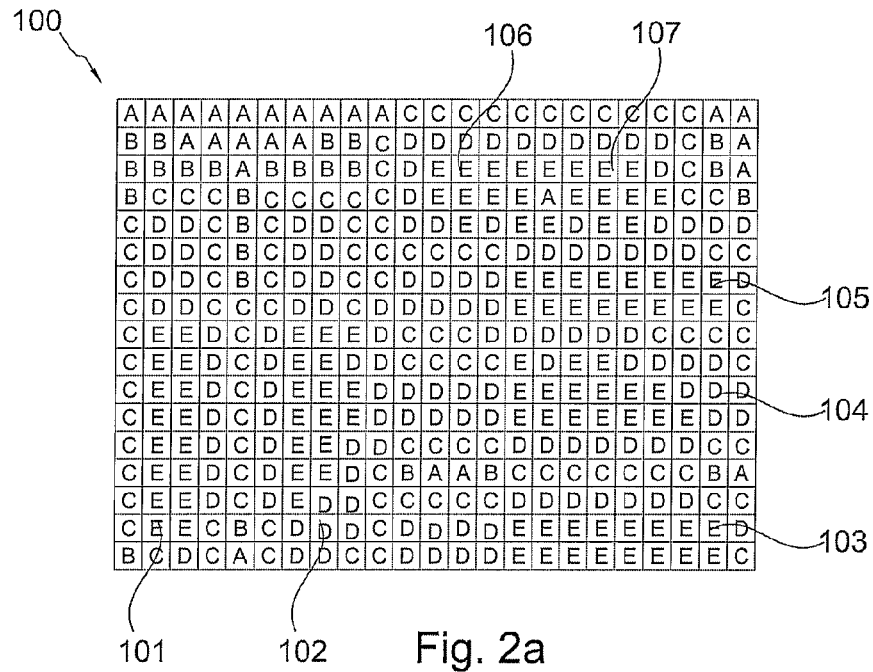
FIG. 2 schematically illustrates different profiles of the cardboard box of FIG. 1.

The illustration in the drawing is schematical. In different drawings, similar or identical elements are provided with the same reference signs.

For the following illustration of the system and method it is referred to FIGS. 1 to 5.

FIG. 1a schematically shows a cardboard box 100 with different products 101, 102, 103, 104, 105, 106, and 107 inside the box 100. These objects/products will have an influence on an RFID tag/label that is affixed to or placed in proximity to the box, depending on the placement of the RFID tag/label and depending on the sensitivity on the respective material parameter.

Due to the required accuracy for this scenario, a scanning grid as shown in FIG. 1b for example is used for a following characterization of the filled box. The scanning grid comprises a plurality of scanning areas which corresponds to measurements of a sensor element. From FIG. 1b it can be seen that each of the products 101, 102, 103, 104, 105, 106, and 107 are scanned by a plurality of different single measurements. Thus, FIG. 1b shows an example of an RF box characterization for enabling a proper selection of an RFID tag/label and/or the location for the placement of the RFID tag/label.

For the measurement or characterization of the cardboard box RF relevant parameters, e.g. relative dielectric constant per square meter ($\in_r/m^{-2}$), loss angle per square meter (tan $(\delta)/m^{-2}$), or relative permeability per square meter ($\mu_r/m^{-2}$), are chosen. A sensor that is used for the characterization of the object/product is placed on the surface or in the proximity of the object/product in such a way that it interferes with the object/product as well as the RFID tag/label would. The size of this sensor and its respective measuring zone is preferably matched to the required accuracy for the desired categorization. Said sensor can scan the object/product in at least one dimension by using actuators such as motors or manually. By measuring the parameter of interest for each zone, a characteristic profile of the object/product may be generated that may be used for a classification or a qualification of products as well as for a detection of the RFID tag/label location that yields the targeted performance.

Figure 2B:
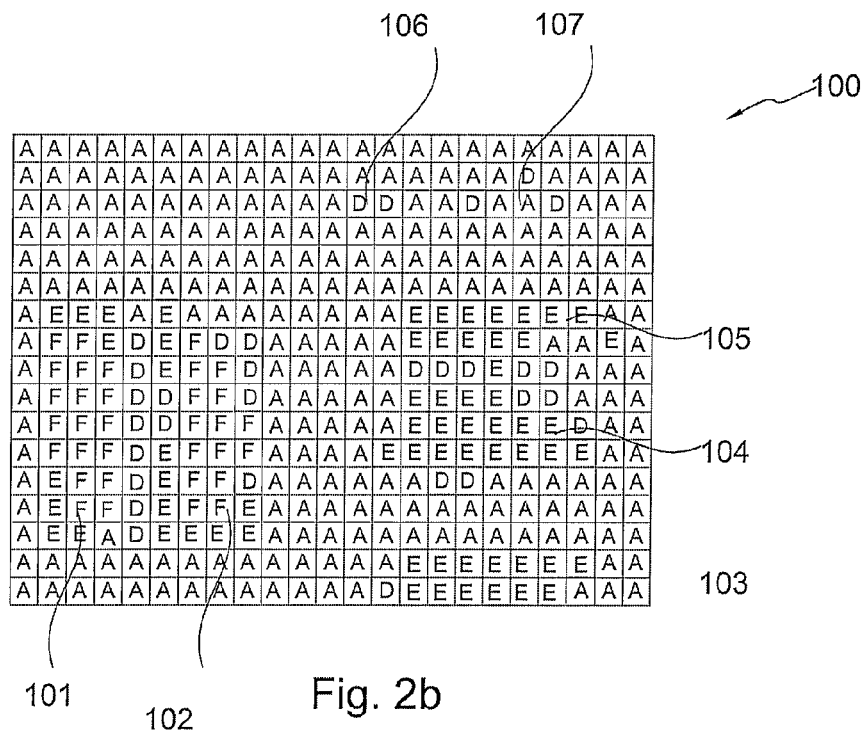
Figures 2C, 2D:
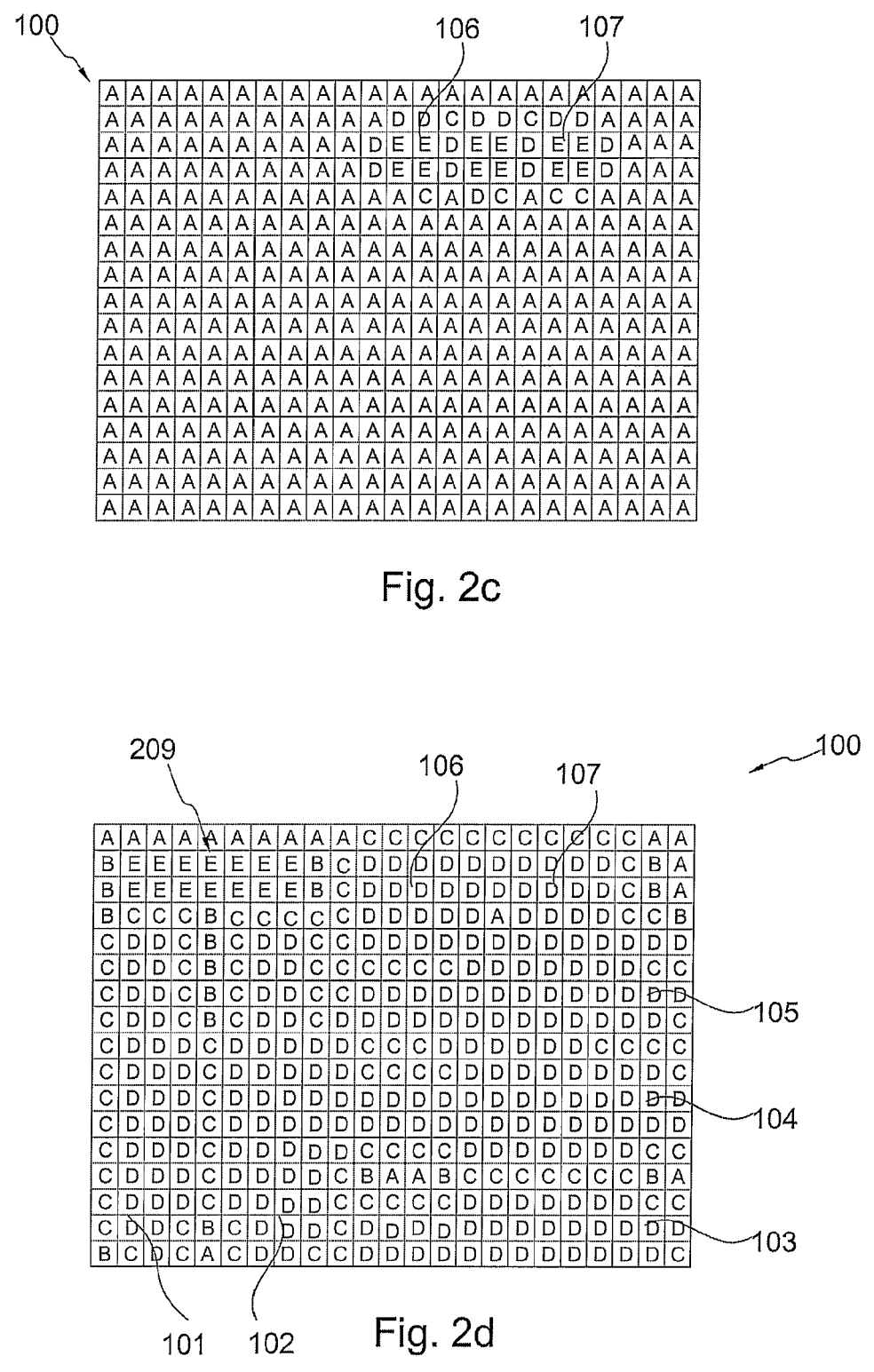

The sensor element or sensor used for the characterization is preferably determined or chosen based on the parameter that mainly interferes with the RFID tag/label and its antenna. In the case of the box characterization, the selected parameters are the relative dielectric constant, the lossy angle or quality and the relative permeability per area. Scanning of the box with said sensor or sensor unit will generate RFID relevant profiles for every selected and measured parameter as shown in FIG. 2a to 2c, for example, the respective profiles may also be called a matrix of the measured values or impact values, which may be derived from the measured values. In particular, FIG. 2a shows schematically a measured dielectric profile. Depending on the value of the relative dielectric constant $\in_r$ in each of the scanning areas, a corresponding letter (for instance one of the letters A, B, C, D, E, F, see FIG. 4a) can be assigned to each of the scanning areas, see FIG. 2a. Alternatively, the information content of FIG. 2a may be represented by a grey scale image in which each of the letters is assigned to a gray scale. From the dielectric profile of FIG. 2a it can be seen, that the products 101, 102, 103, 104, 105, 106, and 107 are slightly silhouetted against free spaces in the box 100 (compare the regions in FIG. 2a with value "E").

FIG. 2b shows schematically a measured quality or loss angle profile. Depending on the value of the loss angle profile in each of the scanning areas, a corresponding letter (for instance one of the letters A, B, C, D, E, F, see FIG. 4a) can be assigned to each of the scanning areas, see FIG. 2b. From the quality profile of FIG. 2b it can also be seen, that the products 101, 102, 103, 104, and 105 are slightly silhouetted against free spaces in the box 100 (compare the regions in FIG. 2b with values "E", "F"), while products 106 and 107 are only hinted by the quality profile (compare the right upper regions in FIG. 2b with values "D"). On the other side from the permeability profile shown in FIG. 2c, only the products 106 and 107 are clearly seen (compare the regions in FIG. 2c with values "D", "E"), while the products 101, 102, 103, 104, and 105 are not visible in the permeability profile.

Where the characterization in terms of the relative dielectric constant (FIG. 2a) may be used to determine the optimal location for UHF RFID-tag/labels in terms of detuning on one hand or matching existing label categories to the application, an HF RFID-tag/label might not be affected by this variations of the relative dielectric constant that much as it would be affected by the relative permeability as shown in FIG. 2c. To categorize the losses at the desired frequency, the quality profile shown in FIG. 2b may be used to further characterize the box. Thus, by using the profiles of FIGS. 2a to 2c a position may be chosen which best fits for the respective RFID-tag or an RFID-tag/label may be chosen which best fits the respective impact values of the respective box or object. In FIG. 2d a position 209 (which shows an accumulation of letters "E") is chosen for the RFID-tag label, which least interferes with the characterization profiles in FIG. 2a to FIG. 2c.

FIG. 3 schematically shows a sensor arrangement which may be used in a system according to an exemplary embodiment. FIG. 3 shows schematically the box 100 onto which a sensor 310 is placed. Furthermore, product 101 is schematically shown in the box 100. The sensor 310 is mounted on a two-axis stepper actuator 311. Furthermore, the sensor 310 is connected via a cable 312 to an oscillator 313 or may form a part of the oscillator 313 itself, which may be a tuneable oscillator. Additionally, the oscillator is coupled to a determination device 314 so that a sensed value can be transferred to the determination device 314.

While a measurement is performed, the sensors used for different characterizations are positioned by two-axis stepper motor carrier to achieve the desired accuracy of the matrix. The measurement data of each area or cell of the matrix are analyzed in order to determine impact values. The determined impact values or the measured values itself may be displayed on a display. In case the impact values or measured values are displayed, the different values may be represented by a colour to allow an easier interpretation of the results. If the characterization requires a characterization along a third axis (z-axis) as well, due to a non flat structure of the box, the three dimensional scanning volume becomes a three dimensional scanning volume.

For the low-cost measurement of the relative dielectric constant per area and the quality-factor, a sensor shown in FIG. 3a can be used, in which the sensor itself is part of the oscillator and thus the resonance frequency of this setup depends on the relative dielectric constant of the measuring area of the sensor.

A coil sensor may be used for the measurement of the relative permeability per area. In principle any kind of sensor can be used with this setup to generate characterization data. Instead of a moving scanning sensor, a sensor array or matrix can be used to allow faster characterization. The sensor is connected to proper measurement equipment that measures the selected parameter(s). The use of a parameter analyzer or a network analyzer may allow an accurate characterization of more than one parameter with one measurement equipment.

After such a characterization has been performed for deriving characterization data, or when the measured data is collected, the product can be categorized as shown in FIG. 4a for example for the relative dielectric constant (compare FIG. 2a). This categorization into different classes then may allow an easy selection of proper RFID tags/labels for the desired application. As an example, in FIG. 4a six classes A to F are depicted, wherein each class relates to a different value of the relative dielectric constant, as indicated by the values 1 to 6 in FIG. 4a, wherein these numbers are arbitrarily and may have the same or another meaning as in FIG. 2a to FIG. 2c. Based on this categorization, RFID tags/labels can be classified and assigned to the categories. A matrix or lookup table as shown in FIG. 4b may allow optimal selection of available RFID tag/label infrastructure that matches the application requirements and thus yield into best performance. Due to the different sensitivity of RFID tags/labels depending on their design and location on the antenna, RFID tags/labels can be placed with their insensitive region on locations where the gradient of the characterized parameter stronger departure from the available label category. This allows an accurate placement even on objects/products that have a narrow repetitive gradient of the parameter that affects the performance of the RFID tag/label. In most cases, the insensitive region of an RFID tag/label is the location of the RFID IC because of its low impedance, compared to the rest of the antenna. According to the lookup table shown in FIG. 4b, for the class F label

2 is suitable, for the class E label 1 is suitable, while for class D labels 1 and 3 are suitable. For class C and B the label 3 is suitable.

Figure 4:
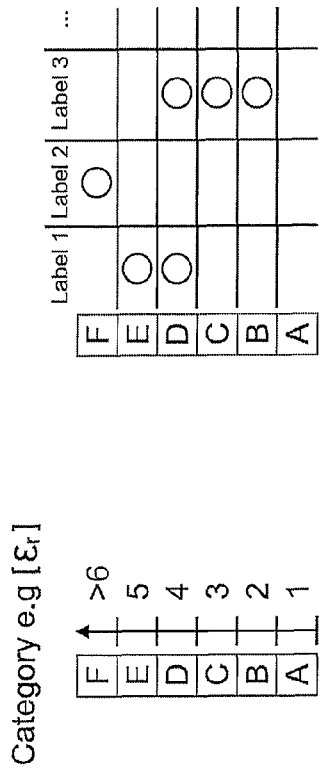
FIG. 4 schematically illustrates an example of a categorization table.
Figure 5:
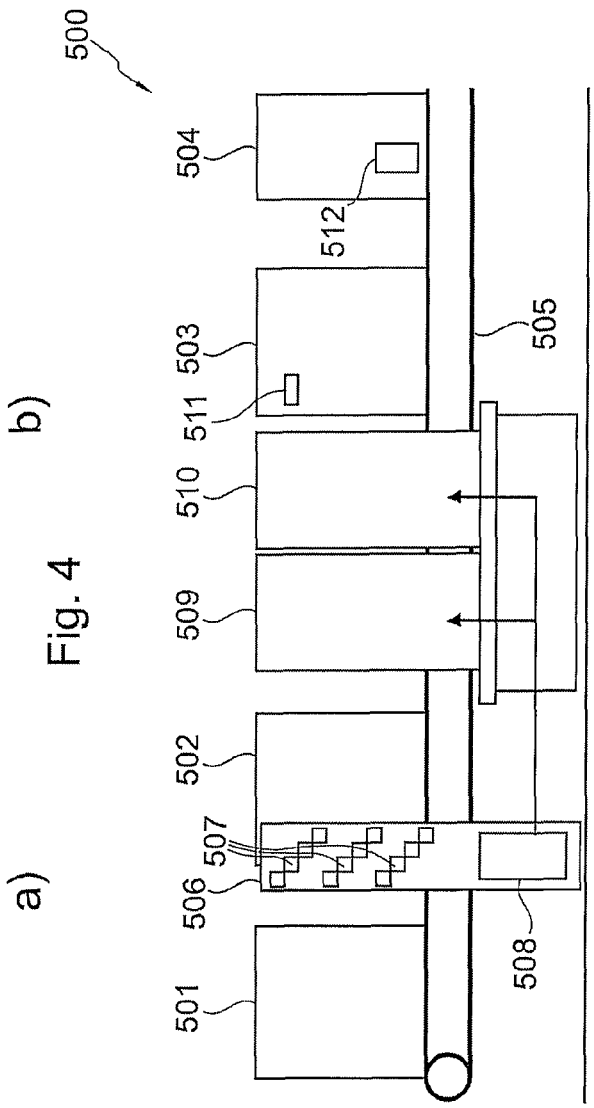
FIG. 5 schematically illustrates a system according to an exemplary embodiment.

FIG. 5 schematically illustrates a system 500 for attaching a contactless transmission element onto an object according to an exemplary embodiment. FIG. 5 schematically shows a first box 501, a second box 502, a third box 503 and a fourth box 504. All these boxes are placed on a conveyor 505, which transports the boxes in FIG. 5 from the left to the right. Furthermore, the system 500 comprises a sensor array 506 comprising a plurality of staggered sensor elements 507. According to FIG. 5, the sensor elements are arranged in three diagonal lines, however other arrangements are also possible. Additionally, the system 500 comprises a determination unit 508, which may be formed by an electronic circuit, and which is adapted to analyze the data measured by the sensor array. The determination unit 508 may be placed in a housing together with the sensor array. Furthermore, the system 500 comprises an RFID-tag printer which comprises two sub-units 509 and 510, wherein one of the sub-units is adapted to print one kind of RFID-tags while the other sub-unit is adapted to print another kind of RFID-tags. The two sub-units may be replaced by one unit which is adapted to print different kinds of RFID-tags. The RFID-tag printer is connected to the determination unit 508 so that the printer may receive instructions which kind of RFID-tags has to be printed for the respective box. Moreover, the system 500 comprises an attachment unit which is, according to the system shown in FIG. 5, a part of the sub-units 509 and 510 of the printer. However, the attachment unit may be formed by a separate unit or the printer may print the RFID-tag directly onto the box at the optimum position or in an optimum orientation. In FIG. 5 are also shown two RFID-tags 511 and 512 which are already applied to the third box 503 and to the fourth box 504, respectively. The RFID-tags are attached to the boxes at positions which are most suitable for this attaching, i.e. positions at which the function of the RFID-tag is least disturbed by the boxes and/or the respective content of the boxes. The first RFID-tag 511 is applied to the third box 503 at the upper left, while the second RFID-tag 512 is applied to the fourth box 504 at the lower left. Summarizing, FIG. 5 shows an example of a real-time objects/product characterization for boxes on a conveyor that does an automatic selection between two different RFID label infrastructures and automatic placement of the RFID tag/label, depending on the measured gradient of the selected parameter(s). Additionally, the system 500 may comprise a storage unit, which may be a part of the determination unit 508 or a separate unit and which is adapted to store measured data, impact values, or lookup tables as shown in FIG. 4.

In the system 500 shown in FIG. 5, the RFID relevant characterization of objects/products can be used to provide an independent frequency selection for RFID applications and selection of the technology that best fits to the requirements of the application and their respective environmental and physical limitations. The optimal placement of an RFID tag/label on the object/product that yields into the targeted performance as well as material quality and/or reliability could be derived from the characterization profiles. Knowing the profile of RF relevant parameters, allows a frequency independent selection of RFID infrastructure that matches to the application and yields into optimal performance.

The boxes coming from the left side in FIG. 5 are uncharacterized. By passing by the sensor array, the characterization is processed. For higher speed or lower interference, the sensor array can be organized as shown in FIG. 5. The result of the characterization is used to select the best matching infrastructure, based on the classification of the parameter(s) and the available infrastructure. In this example, two sub-units of the RFID label printer are present with two different RFID label types are installed. Those printers have the capability of printing an RFID label on any height of the box, for optimal RFID label placement. The geometrical separation of the sensor array used for the characterization and the printers allow the printers to adjust to the computed location on which the RFID label should be applied. If the printer is fast enough, the characterization unit can also be integrated into the printer itself. The described application allows an optimal tag/label selection and placement and therefore yield into better performance of RFID as such without affecting the high product throughputs common in most logistic processes.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A device for characterizing an object, the device comprising
   a sensor circuit; and
   a determination circuit, the determination circuit and the sensor circuit communicatively connected to one another, wherein the sensor circuit is configured and arranged to measure a value of a physical parameter of an object, wherein the physical parameter has an impact on a signal of a contactless transmission element arranged on the object, and
   wherein the determination circuit is configured and arranged to determine an impact value based on the measured value of the physical parameter and to select at least one of a specific contactless transmission element out of a plurality of contactless transmission elements based on the determined impact value, wherein
   the sensor circuit is configured and arranged to measure the value of the physical parameter by measuring a value indicative of the object's interference with a radio-frequency signal carrying an identification signal, and
   the determination circuit is configured and arranged to select the contactless transmission element from a plurality of different contactless transmission elements exhibiting different responses to interference, based upon the determined impact value.

2. The device according to claim 1,
   wherein the physical parameter is one of the group consisting of:
   relative permeability;
   relative dielectric constant; and
   lossy angle.

3. The device according to claim 1, wherein
   the contactless transmission element is an RFID-tag,
   the sensor circuit is configured and arranged to measure the value of the physical parameter by measuring a value indicative of the object's interference with an RFID signal, and
   the determination circuit is configured and arranged to select the RFID-tag from a plurality of different RFID-tags exhibiting different responses to interference, based upon the determined impact value.

4. The device according to claim 3, wherein the RFID-tag is a UHF-RFID-tag or an HF-RFID-tag.

5. The device according to claim 1,
   wherein the determination circuit is further configured and arranged to determine a matrix of impact values and determine a position on the object at which the object has a minimum impact on the signal of the contactless transmission element, and to select one of the plurality of contactless transmission elements by selecting one of a plurality of different types of the contactless transmission elements based upon one of the impact values that is associated with the position on the object at which the object has the minimum impact.

6. The device according to claim 1,
   wherein the plurality of contactless transmission elements comprises different types of contactless transmission elements which have different sensibility to variations of the values of the measured physical parameter; and
   wherein a type of contactless transmission elements is selected which ensures the best performance of the contactless transmission element, wherein the selection is based on the determined impact value.

7. The device according to claim 1, wherein the device further comprises: a plurality of sensor elements, each including a sensor circuit.

8. The device according to claim 7, wherein at least one of the plurality of sensor elements is configured and arranged to measure a second physical parameter.

9. The device according to claim 7, wherein each of the plurality of sensor elements is arranged in a staggered manner with respect to each other.

10. The device according to claim 1, wherein the sensor circuit is fixed to an actuator.

11. The device according to claim 10, wherein the actuator is configured and arranged for positioning the sensor circuit relative to the object.

12. The device according to claim 1, wherein the determination circuit is further configured and arranged to categorize determined impact values into a plurality of classes.

13. The device according to claim 12, wherein the device further comprises:
    a storage circuit,
    wherein the storage circuit is configured and arranged to store a lookup table linking each determined impact value with one of the plurality of classes.

14. A system for attaching a contactless transmission element onto an object, the system comprising:
    a device according claim 1; and
    a contactless transmission element printer,
    wherein the contactless transmission element printer is configured and arranged to print a specific contactless transmission element based on the determined impact value, by printing a circuit component that is configured and arranged to transmit data in response to a wireless signal carrying power, wherein the specific contactless transmission element is attached onto the object at a position at which the physical parameter has the least impact on a signal to be transmitted by the circuit component of the contactless transmission element.

15. The system according claim 14, further comprising:
a conveyor,
wherein the conveyor is configured and arranged to convey the object from the sensor circuit to the printer.

16. The system according to claim 14,
wherein the contactless transmission element printer comprises a plurality of sub-units,
wherein each sub-unit is configured and arranged to print one specific contactless transmission element.

17. A method comprising:
measuring a value of a physical parameter of an object by a sensor circuit, relative to an indication of interference, wherein the physical parameter has an impact on a signal of a contactless transmission element arranged on the object;
determining an impact value based on the measured value by a determination circuit;
selecting a type of contactless transmission element from a plurality of different types of contactless transmission elements respectively communicating via different types of contactless transmissions, based on the determined impact value; and
determining a position on the object based on the determined impact value, at which the object has a minimum impact on the signals of the contactless transmission element.

18. The method according to claim 17, further comprising:
attaching the contactless transmission element at the determined position onto the object.

19. The method according to claim 18, further comprising:
conveying the object to the sensor circuit before the physical parameter is measured; and
conveying the object from the sensor circuit to the attaching unit after the physical parameter is measured.

20. A processor circuit including a program element, which, when being executed by the processor circuit, is configured and arranged to control or carry out a method of characterizing an object, the method comprising:
measuring a value of a physical parameter of an object by a sensor circuit by measuring a value indicative of the object's interference with a radio-frequency signal carrying an identification signal; and
determining an impact value based on the measured value by a determination circuit, wherein the impact value represents an impact of at least a portion of the object on a signal of a contactless transmission element arranged on the object, and being indicative of the impact of the physical parameter upon different types of signals communicated with the contactless transmission element, wherein the processor circuit and program element are configured and arranged to select a type of contact transmission element from different types of contactless transmission elements respectively communicating with the different types of signals, based upon the determined impact value.

21. A non-transitory computer-readable medium, in which a computer program is stored which, when being executed by a processor circuit, is configured and arranged to control or carry out a method of characterizing an object, the method comprising:
measuring a value of a physical parameter of an object by a sensor circuit by measuring a value indicative of the object's interference with a radio-frequency signal carrying an identification signal; and
determining an impact value based on the measured value by a determination circuit, wherein the impact value
represents an impact of at least a portion of the object on a signal of a contactless transmission element arranged on the object, and
is indicative of the impact of the physical parameter upon different types of signals communicated with the contactless transmission element.

22. The device according to claim 1, wherein the sensor circuit is configured and arranged to measure the value of the physical parameter of an object independently of a type of contactless transition element, and determination circuit is configured and arranged to determine the impact value independently of a type of contactless transmission element.

23. The system of claim 14, wherein the contactless transmission element printer is configured and arranged to print a plurality of different types of RFID tags upon objects, and to select and print one of the plurality of different types of RFID tags to be printed upon an object based upon the determined impact value.

24. The non-transitory computer-readable medium of claim 21, wherein the computer program is configured and arranged to select a type of contact transmission element from different types of contactless transmission elements respectively communicating with the different types of signals, based upon the determined impact value.

25. The device according to claim 1, wherein the contactless transmission element is an RFID-tag, and wherein the determination circuit is further configured and arranged to determine a matrix of impact values and determine a position on the object at which the object has a minimum impact on the signal of the contactless transmission element.

26. A device for characterizing an object, the device comprising
a sensor circuit; and
a determination circuit, the determination circuit and the sensor circuit communicatively connected to one another, wherein the sensor circuit is configured and arranged to measure a value of a physical parameter of an object, wherein the physical parameter has an impact on a signal of a contactless transmission element arranged on the object,
wherein the determination circuit is configured and arranged to determine an impact value based on the measured value of the physical parameter and to select at least one of a specific contactless transmission element out of a plurality of contactless transmission elements based on the determined impact value, and wherein the determination circuit is further configured and arranged to determine a matrix of impact values and determine a position on the object at which the object has a minimum impact on the signal of the contactless transmission element.

* * * * *